United States Patent [19]

Schrader et al.

[11] Patent Number: 4,952,247
[45] Date of Patent: Aug. 28, 1990

[54] PROCESS FOR THE CLEANING OF A PACKED COLUMN

[75] Inventors: Ulrich Schrader; Gerhard Alzner, both of Munich, Fed. Rep. of Germany

[73] Assignee: Linde Aktiengesellschaft, Wiesbaden, Fed. Rep. of Germany

[21] Appl. No.: 235,341

[22] Filed: Aug. 12, 1988

[30] Foreign Application Priority Data

Aug. 14, 1987 [DE] Fed. Rep. of Germany ....... 3727191
Jun. 24, 1988 [DE] Fed. Rep. of Germany ....... 3821349

[51] Int. Cl.$^5$ .................. B08B 9/00; B01D 53/34; C01B 17/05
[52] U.S. Cl. .................. 134/22.12; 55/73; 55/90; 55/233; 55/242; 134/22.13; 134/22.14; 134/22.17; 134/22.19; 261/98; 422/170; 423/224; 423/226; 423/228; 423/232; 423/573.1
[58] Field of Search .......... 502/21, 22, 25, 26, 502/30, 34, 517; 423/215.5, 224, 228, 232, 234, 242; 55/73, 90; 134/22.12, 22.13, 22.14, 22.17, 22.19, 23, 25.5

[56] References Cited

U.S. PATENT DOCUMENTS

| | | | |
|---|---|---|---|
| 3,505,207 | 4/1970 | Haney et al. | 502/30 |
| 4,297,330 | 10/1981 | Schlauer | 423/232 |
| 4,537,752 | 8/1985 | Weber | 423/224 |
| 4,687,496 | 8/1987 | Weber | 423/224 |

FOREIGN PATENT DOCUMENTS 55-38174 10/1980 Japan ........................ 55/73

Primary Examiner—Paul E. Konopka
Attorney, Agent, or Firm—Millen, White & Zelano

[57] ABSTRACT

In a process for cleaning, cleaning a packed column utilized in a gas scrubbing operation wherein the packing is obstructed by solids formed during the scrubbing step, the obstructions are removed in a maximally economical fashion and without interrupting of normal operation. The packed column contains at least n, wherein n>1, superimposed packed beds spatially separated from one another. During cleaning, the lowermost up to maximally the (n−1)th packed bed are flooded with scrubbing agent. Preferably, the packed column is used for scrubbing $H_2S$ out of a feedgas mixture with an oxidative scrubbing agent wherein sulfur is formed during the scrubbing operation and deposited in the packed beds.

10 Claims, 2 Drawing Sheets

PROCESS FOR THE CLEANING OF A PACKED COLUMN

BACKGROUND OF THE INVENTION

The invention relates to a process for the cleaning and, respectively, restoring of a packed column with packing elements, the specific gravity of which is lower than the specific gravity of a scrubbing agent. The column is utilized for gas purification by means of a scrubbing operation, wherein obstructions of the packing space by solids formed during the scrubbing step occur, requiring from time to time restoration of the column by flooding.

Packed columns are preferably employed for gas purification, especially the scrubbing of gases, since they offer large gas/liquid exchange surfaces and thus effectively enhance the scrubbing operation. See, e.g., *Ullmanns Encyklopaedie der Technischen Chemie* 2:591–595 (1972).

In the case of oxidative $H_2S$ scrubbing operations, for example, elemental sulfur is formed during scrubbing which leads to clogging of the packed column thus making regeneration of the packing charge a necessity. This phenomenon is caused by a variety of formed deposits, and can also occur in other scrubbing operations, for example, metal sulfides or metal carbonyl in methanol scrubbing operations, phosphines in potash scrubbing operations and the like. In *Ullmans Encyklopaedie der Technischen Chemie* 2:595, 1972, it recommended not to use packed columns in scrubbing operations if a danger of contamination from deposits existed.

For example DOS No. 3,513,809, which corresponds to U.S. Pat. No. 4,687,496, discloses a method of cleaning a packed column utilized in a scrubbing operation, performed with a scrubbing medium, for gas purification, and having been obstructed with deposits. In order to break up these deposits, this method floods, i.e., fills up, the packed column with, for example, scrubbing agent.

By introducing an inert gas into the column filled with scrubbing agent, the floatable packing elements are floatingly stirred up and set into a swirling motion whereby the obstructions are broken up and either drop to the bottom of the vessel from which they can be withdrawn or they are discharged from the column together with the scrubbing agent.

A grave disadvantage of the known method resides in that at lest two parallel-connected scrubbing columns are necessary for the regenerating process in order to operate the scrubbing operation continuously. In this arrangement, gas is scrubbed in one column while the other column, filled with scrubbing medium, is cleaner. The necessity of employing two scrubbing columns has a very negative effect on the costs of the scrubbing process since scrubbing columns are the most expensive parts of a scrubbing operation. The pipelines required on account of the second scrubbing column likewise represent a considerable cost factor.

A further drawback of the known process resides in that a very large amount of scrubbing agent must constantly be made available for cleaning, this scrubbing agent being stored in an additional storage tank. Furthermore, a compressor for introduction of the inert gas is required in order to overcome the pressure gradient resulting from the standing level of the scrubbing medium present in the column during cleaning.

SUMMARY OF THE INVENTION

It is therefore an object of the present invention to provide a process wherein packed columns clogged by solids can be cleaned and, respectively, freed of the obstructions during normal operation in a simple and economical way.

Under further study of the specification and appended claims, further objects and advantages of this invention will become apparent to those skilled in the art.

These objects are attained according to the invention by providing a packed column containing n, wherein $n > 1$, superimposed beds of packing spatially separated from one another, and wherein cleaning of the column is performed by flooding the lowermost up to maximally the $(n-1)$th packed bed with scrubbing agent.

The invention is based on the premise that solids which are formed upon entrance of the crude gases into the scrubbing column lead to obstructions predominantly in the lower portion of the packing charge. Thus, the subdivision of the packing charge into several beds in accordance with the invention has the result that the obstructions occur predominantly only in the lower beds and consequently only the lowermost to maximally the $(n-1)$th bed has to be cleaned, instead of the total packing charge.

In accordance with the invention, the packing material of the column has a specific gravity less than that of the flooding fluid. In this connection, it is preferred that the specific gravity difference between the liquid and the packing elements be about 0.2 to 1.0, especially about 0.05 to 0.1.

It is preferred that the packing elements have a specific gravity less than 1, especially in the range of 0.9 to 0.97 for polyethylene, 0.9 for polypropylene.

Examples of pairs of packings and liquids include but are not limited to:

| Packing | Liquid |
|---|---|
| polyethylene polypropylene polystyrene hollow bodies made out of teflon | water or any aqueous system as $NaOH/H_2O$, amine/$H_2O$ $Na_2CO_3/H_2O$ |

In a broad embodiment of the process, the packing elements should possess a specific gravity less than that of the flooding fluid, e.g., scrubbing medium. This is to enable the packing elements to be buoyant, or suspended in the fluid when the column is flooded by the flooding material. More particularly, the packing elements should preferably possess a specific gravity of less than about 1.0, e.g., when the flooding fluid utilized is an aqueous solution.

If, during operation of the scrubbing column, a no longer tolerable pressure drop occurs in the lowermost bed and/or the uppermost packed bed to be cleaned and/or anyone of the packed beds to be cleaned on account of obstructions by formed deposits, then cleaning of this bed as well as those beds located below or thereabove up to maximally the $(n-1)$th bed is required. Such cleaning is suitably performed at regular intervals.

According to a preferred embodiment of the process of this invention, provision is made that during regeneration of the lowermost up to maximally the $(n-1)$th packed bed, crude gas flows only through the packed bed located thereabove.

Advantageously, to improve the turbulent intermixing of the packing elements during cleaning, pure gas or an inert gas, such as, for example, air or $N_2$, or a mixture of inert gas and pure gas is blown in at least below the lowermost bed. Such gas or gas mixture intermingles with the crude gas after flowing through the uppermost packed bed undergoing cleaning. It is also possible that a certain part of the crude feedgas could also be used to reduce turberlence within the bed during regeneration.

In certain cases and with particularly obstinate obstructions, it is advantageous to agitate the beds to be cleaned additionally by mechanically stirring and further advantageous to simultaneously inject a gas at least below the lowermost bed to be regenerated. A mechanical device can be an agitator causing all upward erected liquid flow to mix up the packings.

For cleaning purposes, the scrubbing agent is for a short time not withdrawn from the bottom of the column so that the standing level of scrubbing agent in the column increases to such an extent that overflowing of the thus-formed froth of solids into, for example, a collecting vessel or a separator, is ensured. This overflowing of the bed(s) takes place in the proximity of a retaining means, for example, a holddown grating, for the stirred-up packing elements. The discharge of loaded scrubbing agent from the bottom of the column in regulated, for example, by means of a valve.

After cleaning is finished, preferably lasting between 1 and 8 hours, the lowermost to maximally the $(n-1)$th packing charge is again placed into operation. The standing level of scrubbing agent is lowered to the normal level in the bottom of the scrubbing column, and the feed of inert and, respectively, pure gas is stopped.

During the cleaning periods of the lowermost to maximally the $(n-1)$th packed bed, the crude gas flows only through the beds located thereabove. Since the cleaning times are relatively very brief, the solid matter that may form in the uncleaned beds during cleaning will not be significant. Cleaning of these packed beds could take place, for example, within the scope of the yearly shutdown of the facility for servicing reasons.

An oxidative $H_2S$ scrubbing operation conducted in an experimental packed column with one packed bed and operated in accordance with this invention showed the result, for example, that at a feed rate of crude gas of 200 $Nm^3/h$ having an $H_2S$ content of 1,500 ppm, the column had to be cleaned about once a week, the cleaning period being about 2 hours.

The process of this invention can be utilized in all scrubbing operations for gas purification—chemical, physical, and chemical-physical ones—wherein packed columns are employed and wherein solids are formed during the scrubbing step which clog the packed column. Such processes include, e.g., absorption methods using monoethanol amine or NaOH, whereby blockages may occur due to the formation of hydrocarbon polymerization products.

Advantageously, the process of this invention is utilized for scrubbing out $H_2S$ and, respectively, for $H_2S$ fine purification in an oxidative scrubbing step wherein sulfur is formed clogging the packed column. In such a scrubbing operation, according to a preferred embodiment of the process of this invention, the sulfur recovered during cleaning is withdrawn from the column.

Whereas this invention has general use for any scrubbing system or the like where solids constitute a clogging problem, it is especially applicable to $H_2S$ oxidative scrubbing system. Accordingly, the invention is particularly applicable in connection with the treatment of crude natural gas, claus tail gas or $CO_2$ rich gas.

In total, the process of this invention thus exhibits the advantage that investment costs are substantially lower sine the second scrubbing column is eliminated and the pipeline system is reduced. Furthermore, a substantially smaller quantity of scrubbing medium is needed for the cleaning procedure in the process of the present invention. The installation of an additional storage tank thereby becomes superfluous. Also, a blower can be used, instead of an expensive compressor. The blower need only expend a conveying power against a standing level of scrubbing agent in correspondence with the number of beds to be cleaned, thereby resulting in an advantageous effect on the initial investment as well as operating expenses.

The entire text of all applications, patents and publications, if any, cited above and below, and of West German Application Nos. P. 37 27 191.1 and P. 38 21 349.4, filed Aug. 14, 1987, and June 24, 1988, respectively, are hereby incorporated by reference.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
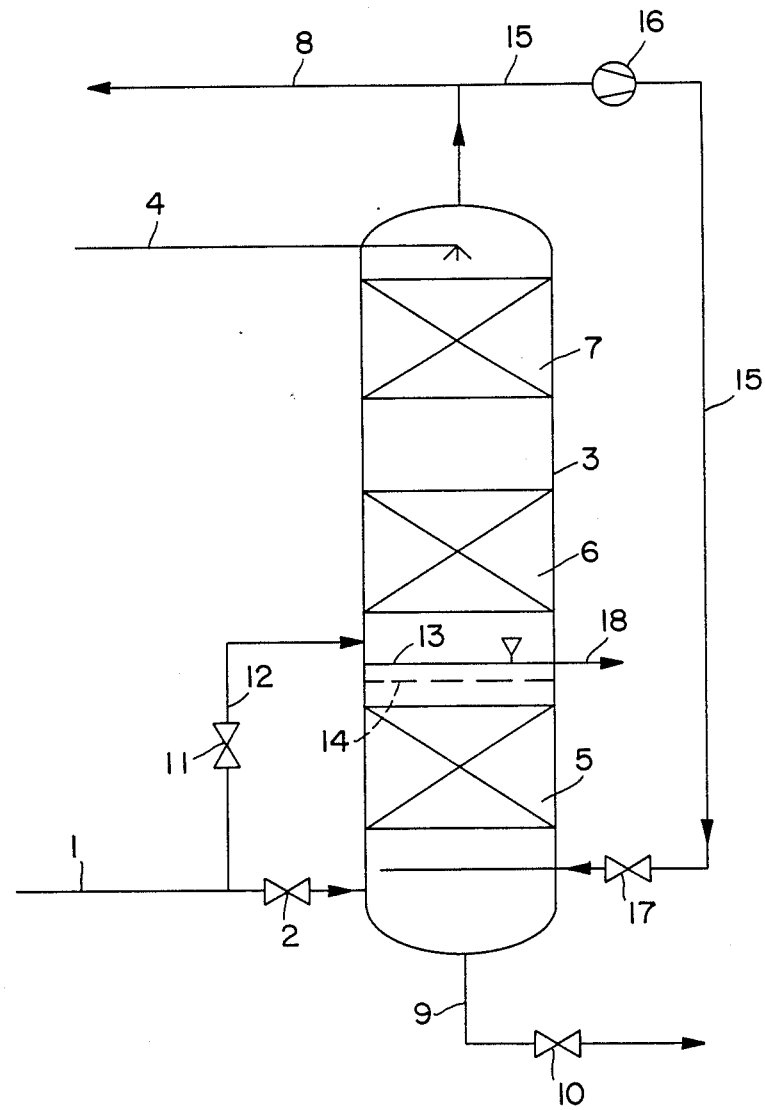
FIG. 1 schematically illustrates a process for cleaning of a scrubbing column used in connection with an oxidative $H_2S$ scrubbing operation wherein an additional feed of pure gas is employed during cleaning.

According to FIG. 1, a crude gas mixture containing $H_2S$ in a concentration of 1,500 ppm is introduced via conduit 1, with valve 2 being opened, into the lower section of a scrubbing column 3. The column contains a plurality of packed beds 5, 6 and 7, wherein polypropylene, polyethylene (low or high pressure), polyvinyl chloride, Teflon are employed as the packing elements having a specific gravity of up to approximately 300 $Hg/m^3$. The crude gas mixture is brought into contact with an aqueous alkali carbonate solution, which also contains metallic salts (specific gravity, e.g., approximately 1000 to 250 $Hg/m^3$). The scrubbing column 3 differs from columns for distillation in that provisions for a reboiler and a reflux are not necessary. The alkali carbonate solution is fed via conduit 4 and introduced into the upper section of scrubbing column 3 during the step of oxidative scrubbing wherein elemental sulfur is formed and predominantly deposited in the lowermost packed bed 5. After flowing through the packed beds, 5, 6 and 7, the purified gas is withdrawn via conduit 8. Via conduit 9 and regulating valve 10, and loaded alkali carbonate solution is discharged from the bottom of the scrubbing column 3 and passed on to a system for cleaning of a scrubbing agent (not shown).

If, during operation, a not longer tolerable, i.e., an excessive pressure drop is detected across packed bed 5, valve 2 is closed and valve 22 is opened, thus initiating the cleaning phase of packed bed 5. The crude gas therefore flows, during cleaning, via conduit 1, opened valve 11, and conduit 12 into the scrubbing column 3 where it is purified as described above. During this step, the thus-formed sulfur is deposited in packed bed 6. Since the cleaning period is relatively brief, however, these obstructions are so minor that normal operation is to disturbed thereby. Similar conduit means can be provided so that beds 5 and 6 can be cleaned while crude gas continues to flow through bed 7.

For cleaning packed bed 5 proper, no alkali carbonate solution is withdrawn for a short period of time by closing the valve 10 so that the standing level of the scrubbing agent in the scrubbing column 3 rises to a liquid level 13 lying in the proximity of the bed retaining means, e.g., the holddown grating 14. At the same time, pure gas is supplied via conduit 15, blower 16 and opened valve 17 to a point below packed bed 5. In this manner, the packing elements of bed 5 are stirred up and floated upwards towards the holddown grating 14 while simultaneously being set into a swirling motion so that the sulfur obstructions are broken up and withdrawn via conduit 18 as sulfur froth above the holddown grating 14.

As soon as the pressure drop in the lowermost packed bed 5 has been overcome, cleaning is terminated. The standing level of the scrubbing agent is lowered to its normal level by regulating the discharge of scrubbing agent through valve 10. Valve 11 is then closed and valve 2 is opened. Furthermore, feed of pure gas is interrupted by closing valve 17. For detecting an intolerable loss in a packed bed thereby initiating the cleaning phase or determining the end of the cleaning phase any king of pressure-drop measurement for each bed can be used.

Figure 2:
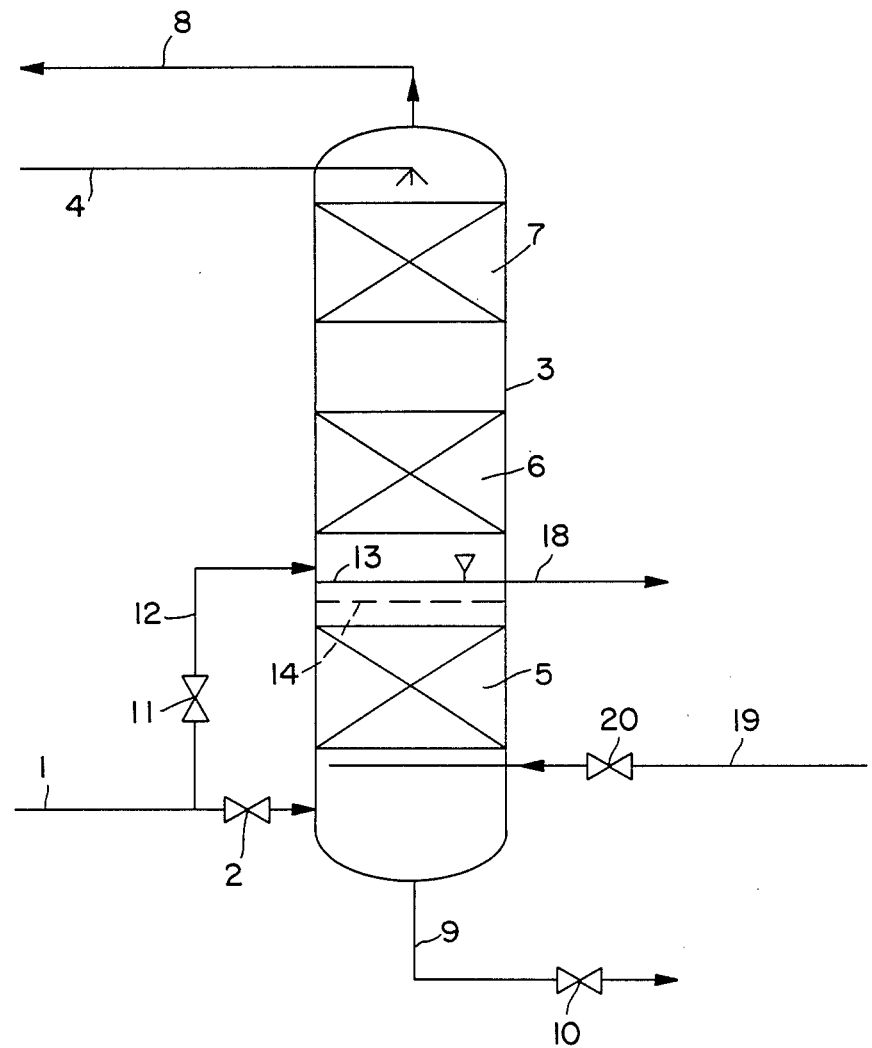
FIG. 2 schematically illustrates a process for cleaning of a scrubbing column used in connection with an oxidative $H_2S$ scrubbing operation wherein an additional feed of an inert gas is employed during cleaning.

The process according to FIG. 2 differs from that of FIG. 1 only in that, during cleaning, inert gas is supplied in place of pure gas via conduit 19 and valve 20.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for cleaning a packed column comprised of packing elements retained in a plurality of spaced packed beds, "n" in number, superimposed in a vertical array from a lowermost to an uppermost packed bed, wherein the column is utilized in a scrubbing process for gas purification in which crude gas is scrubbed to remove $H_2S$ therefrom in an oxidative scrubbing operation with a scrubbing agent of a selected specific gravity to produce purified gas, and wherein the packed beds become obstructed by solid sulfur which accumulates during the scrubbing step, the cleaning process comprising:

selecting packing elements having a specific gravity lower than the specific gravity of the scrubbing agent;

flooding the column with a scrubbing agent from a level above the lowermost packed bed up to maximally a level above the packed bed $(n-1)$ just beneath the uppermost packed bed to remove the solid sulfur from the elements in the beds which have been immersed by suspending the solid sulfur in the scrubbing agent;

removing the solid sulfur from the packed column by removing a portion of the scrubbing agent suspending the solid sulfur, and lowering the level of the scrubbing agents to a level beneath the packed beds, and continuing the scrubbing operation during the cleaning process.

2. A process according to claim 1, wherein during cleaning of the lowermost to maximally the $(n-1)$th packed bed, the crude gas flows only through the packed beds located thereabove.

3. A process according to claim 1, wherein the purified gas is blown in during cleaning at a location positioned at least below the lowermost packed bed.

4. A process according to claim 2, wherein purified gas is blown in during cleaning at a location positioned at least below the lowermost packed bed.

5. A process according to claim 1, wherein an inert gas is blown in during the cleaning at a location positioned at least below the lowermost packed bed.

6. A process according to claim 2, wherein an inert gas is blown in during the cleaning at a location positioned at least below the lowermost packed bed.

7. A process according to claim 1, wherein a mixture of inert gas and the purified gas is blown in during cleaning at a location positioned at least below the lowermost packed bed.

8. A process according to claim 2, wherein a mixture of inert gas and the purified gas is blown in during cleaning at a location positioned at least below the lowermost packed bed.

9. A process according to claim 1, wherein the beds to be cleaned are additionally agitated by stirring.

10. A process according to claim 9, wherein a gas is blown in during the cleaning at least below the lowermost charge to be regenerated.

* * * * *